United States Patent [19]

Rogers

[11] 4,331,062
[45] May 25, 1982

[54] VISUAL NOTE DISPLAY APPARATUS

[76] Inventor: Allen E. Rogers, 2105 6th Ave., NE., Owatonna, Minn. 55060

[21] Appl. No.: 155,499

[22] Filed: Jun. 2, 1980

[51] Int. Cl.³ .............................................. G09B 15/08
[52] U.S. Cl. .................................... 84/478; 84/470 R
[58] Field of Search ..................... 84/478, 470 R, 482; 248/280.1, 282, 418

[56] References Cited

U.S. PATENT DOCUMENTS

| | | | |
|---|---|---|---|
| 2,653,330 | 9/1953 | Nolan | 248/282 |
| 2,814,230 | 11/1957 | Johnston | 84/478 |
| 3,091,152 | 5/1963 | Bridges | 84/478 |
| 3,153,365 | 10/1964 | Redmond | 84/478 |
| 3,155,000 | 11/1964 | Gnatt | 84/478 |
| 3,180,201 | 4/1965 | Low, Jr. et al. | 84/477 |
| 3,256,765 | 6/1966 | Siegel | 84/478 |
| 3,395,461 | 8/1968 | Krause | 35/6 |
| 3,429,216 | 2/1969 | Lawrence | 84/471 |
| 3,429,217 | 2/1969 | Lawrence | 84/471 |
| 3,446,109 | 5/1969 | Scott et al. | 84/478 |
| 3,460,426 | 8/1969 | Jensen | 84/478 |
| 3,559,942 | 2/1971 | Lucasey | 248/418 |
| 3,570,360 | 3/1971 | Siegel | 84/477 |
| 3,695,138 | 10/1972 | Andersen | 84/470 |
| 3,710,671 | 1/1973 | Reid, Sr. et al. | 84/477 R |
| 3,744,368 | 7/1973 | Lady | 84/470 |
| 3,823,637 | 7/1974 | Scott | 84/470 |
| 4,024,789 | 5/1977 | Humphrey et al. | 84/477 R |
| 4,082,029 | 4/1978 | Rumer, Jr. et al. | 84/484 |
| 4,084,213 | 4/1978 | Kirchner et al. | 361/384 |
| 4,097,016 | 6/1978 | Petrucci | 248/418 |

OTHER PUBLICATIONS

Conn Teacher's Console Brochure, Conn Corporation, Elkhart, Ind.
Conn Student Station Brochure, Conn Corporation, Elkhart, Ind.
Conn Music Learning System Brochure, Conn Corporation, Elkhart, Ind.
Wurlitzer Educational Products Brochure, WEPCO, Inc., DeKalb, Ill.
Wurlitzer Key/Note Visualizer Model 208 Brochure, Wurlitzer Educational Products, DeKalb, Ill.
Wurlitzer Mobile Music Learning System Brochure, The Wurlitzer Company, DeKalb, Ill.

Primary Examiner—J. V. Truhe
Assistant Examiner—Forester W. Isen
Attorney, Agent, or Firm—Burd, Bartz & Gutenkauf

[57] ABSTRACT

An apparatus for visually displaying music notes on a note display panel mounted on an electronic piano with a support arm. The electronic piano has a keyboard electrically coupled to an electronic circuit operable to produce an audio output in accordance with the depression of one or more keys. The arm is rotatably in a mount attached to the piano for movement about a first upright axis. A first motion limiting unit attached to the mount and arm limits the rotation of the arm about the piano. A second motion limiting unit attached to the panel and arm limits rotation of the panel about an upright axis relative to the arm. A modified structure has the arm fixed to the piano. The panel has a grand staff indicia coordinated with vertically disposed first light means corresponding to chord note information and second light means diagonally corresponding to an ascending note scale information. A keyboard representation is located below the staff indicia. Third light means associated with the piano key indicia of the keyboard representation is coordinated with the second light means to provide visual information as to the keys depressed on the electronic piano. An electric circuit means having on-off switches electrically couples the electronic piano with the first, second, and third lights so that the lights can be selectively operated. The electronic circuit has a switch assembly having a plurality of key signature switches operable to coordinate the first, second, and third lights with the piano keyboard in accordance with the key signature of the music that is played.

6 Claims, 20 Drawing Figures

VISUAL NOTE DISPLAY APPARATUS

SUMMARY OF THE INVENTION

The invention relates to a visual information display apparatus for use with a digital actuated means to provide the user with at least one visual signal. More particularly, the information display apparatus is a music note display means movably mounted on an electronic piano and operable to present visible light notations corresponding to scale, chord and keyboard information of an actuated key of the electronic piano. The music note display apparatus is a visual aid for teaching music note reading. The display means presents the scale in a four bar scale pattern having a 44 note range F21 to C64. The chord is in a 26 note two row vertical pattern adjacent the time notation. The keyboard representation is located below the scale pattern. The display means has light means, as incandescent lights or light emitting diodes, for providing visible light corresponding to each key of the electronic piano that is actuated. Control means associated with scale, chord, and keyboard light means is selectively operable so that any combination of scale, chord, or keyboard light notation can be displayed. The control means includes a switch assembly having a plurality of key signature switches operable to coordinate the display means with the piano keyboard in accordance with the key signature of the music that is being played.

The music note display means is mounted on the electronic piano with an arm means. One form of the arm means is pivotally mounted on the piano so it can be moved relative to the piano to locate the music note display means in a position where it can be viewed by one or more persons, including the player of the piano. A mount pivotally connects the arm means to the piano. Mount and arm means have coating motion limiting means which restrict the rotation of the arm means about the upright axis of the mount. A second motion limiting means connects the music note display means with the arm means and limits the rotation of the music note display means about a second upright axis allowing the music display means to be moved to positions facing the player and/or an audience. In another form of the arm means, an upright arm is secured to one side of the piano. A motion limiting means mounts the display means on the arm for rotational movement about a generally upright axis. The motion limiting means has coacting lip and stop members located within the arm to restrict movement of the display means to about 180 degrees. The music display means being carried by the piano is portable with the piano. A separate stand structure is not required to locate the music display means in an operative position relative to the piano and audience.

DESCRIPTION OF PREFERRED EMBODIMENT

Figures 1, 2:
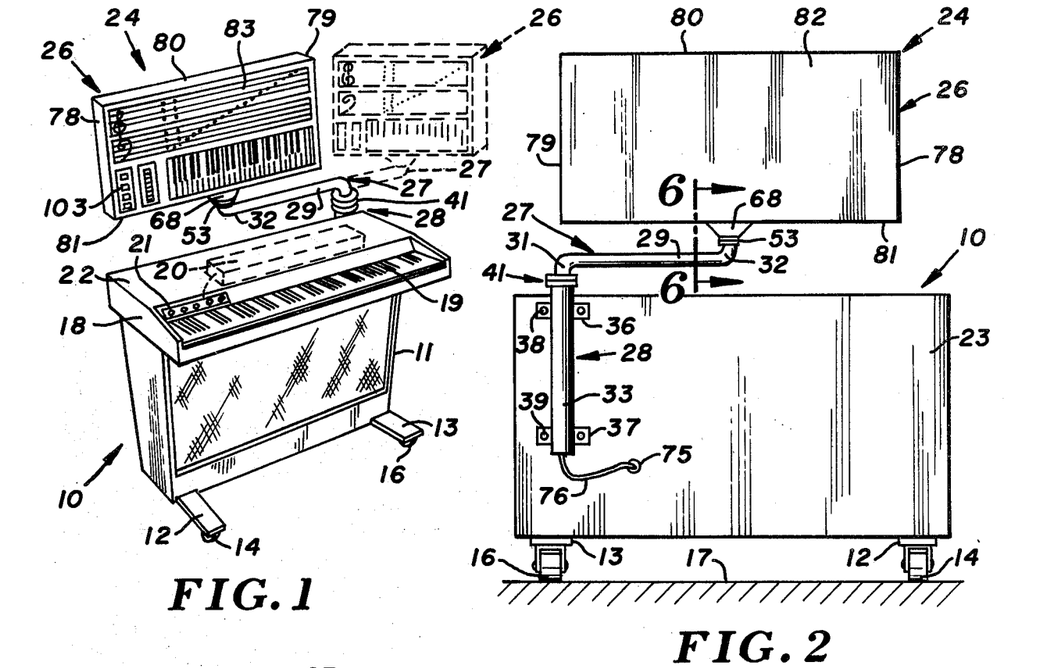
FIG. 1 is a perspective view of an electronic piano equipped with a music note display apparatus of the invention.
FIG. 2 is an enlarged rear elevational view of the electronic piano and music note display apparatus of FIG. 1.

Referring to FIG. 1, there is shown an electronic piano indicated generally at 10. Piano 10 is an electronic keyboard instrument having an upright generally rectangular case or housing 11 mounted on a pair of horizontal support arms 12 and 13. Pairs of caster wheels 14 and 16 are secured to opposite ends of arms 12 and 13, respectively, to facilitate the movement of piano 10 over floor 17. A shelf unit 18 is attached to the top of housing 11. Shelf unit 18 has a keyboard 19 having the conventional piano keys. Keyboard 19 is coupled to a solid state electronic circuit 20. Circuit 20 includes a crystal controlled tone generator and an audio output 120. The circuit 20 is controlled with a switch panel 21 mounted on front of a cover 22 which closes the top of shelf unit 18.

Housing 11 has an upright back wall 23 which carries a note display apparatus indicated generally at 24. Note display apparatus 24 comprises a note display panel 26 pivotally connected to a panel support arm 27. The panel support arm 27 is carried in a mount 28 secured to housing back wall 23. Support arm 27 is a tubular member having an elongated generally horizontal body 29, a downwardly directed leg 31, and an upwardly directed neck 32. Body 29 has a length such that neck 32 can be located generally along the center line of piano 10, as shown in FIGS. 1 and 2.

Mount 28 has an upright cylindrical member or sleeve 33 having a vertical cylindrical passage 34 accommodating the lower portion of leg 31. Leg 31 telescopes down into passage 34. The leg 31 has an outside diameter that is slightly smaller than the inside diameter of passage 34 so that leg 31 can rotate about the upright axis of sleeve 33. Leg 31 projects downwardly into passage 31 so as to support body 29 in a generally horizontal position. Upper and lower sections of sleeve 38 are attached by welds or the like to plates 36 and 37. Bolts 38 and 39 secure plates 36 and 37, respectively, to the left side of back wall 23, as shown in FIG. 2.

Figure 3:
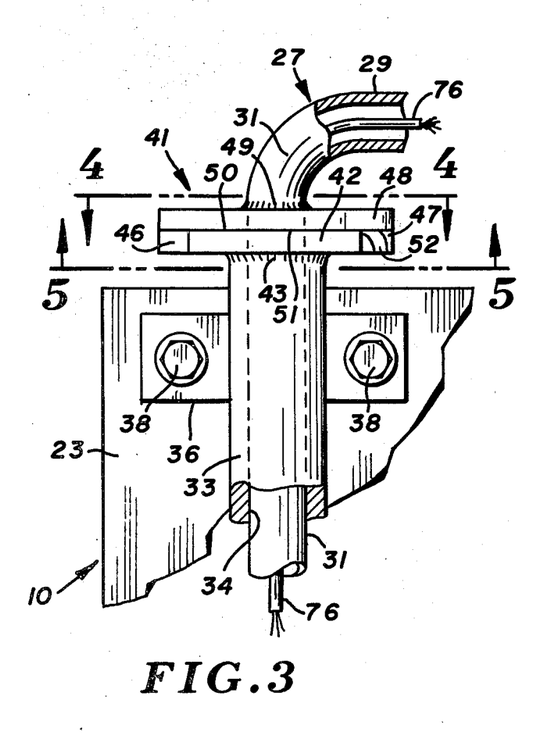
FIG. 3 is an elevational view partly sectioned of the mount for the support arm of the note display apparatus.
Figure 4:
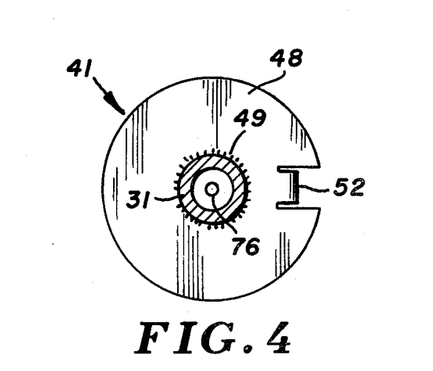
FIG. 4 is a sectional view taken along the line 4—4 of FIG. 3.
Figure 5:
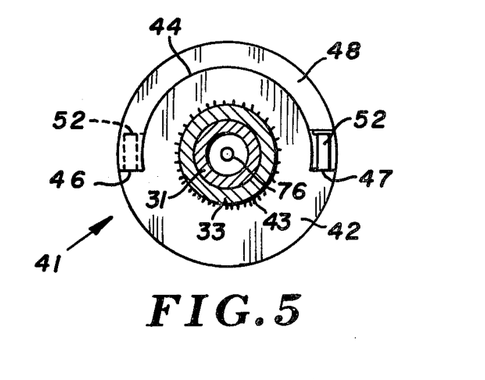
FIG. 5 is a sectional view taken along the line 5—5 of FIG. 3.

The upper end of sleeve 33 projects upwardly from above the top plane of cover 22. A motion limiting structure indicated generally at 41 is located on top of sleeve 33. As shown in FIGS. 3, 4, and 5, motion limiting structure 41 comprises a first annular plate 42 secured by a weld 43 to the top of sleeve 33. Plate 42 has a semi-circular outer edge 44 joined at its opposite ends to outwardly directed shoulders 46 and 47. As shown in FIG. 5, shoulders 46 and 47 are slightly below a diameter line and opposite each other. The shoulders 46 and 47 function as stops for limiting the rotation of the panel support arm to 180 degrees about the upright axis of sleeve 33. Motion limiting structure 41 further includes a second annular plate 48 which is secured to the upper end of leg 31 with a weld 49. Plate 48 has a generally flat annular bottom surface 50 located in engagement with the top flat face 51 of the first annular plate 42. Plates 42 and 48 provide a vertical stop for arm 27 and permit rotational movement of arm 27 about an upright axis of sleeve 33. Plate 48 has a downwardly directed peripheral tab or projection 52. Tab 52 projects down into the horizontal plane of plate 42 and is adapted to engage shoulders 46 and 48. Tab 52 functions as a stop member for selectively engaging with the shoulders 46 and 47 for limiting rotational movement of arm 27 about the upright axis of mount 28 to about 180 degrees, as shown in full and broken lines in FIGS. 1 and 5.

Figure 9:
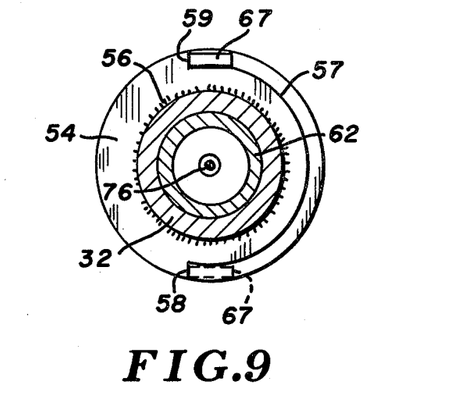
FIG. 9 is a sectional view taken along the line 9—9 of FIG. 6.

Note display panel 26 is movably mounted on neck 32 with a swivel unit indicated generally at 53. As shown in FIGS. 6-9, swivel unit 53 has a first plate 54 secured by weld 56 to the top of the leg 32. Plate 54 has semi-circular outer edge 57 terminating in outwardly directed shoulders 58 and 59. Shoulders 58 and 59 are located in opposite portions of plate 55 so that the note display panel 26 can rotate about 180 degrees about the upright axis of neck 32. The upright axis of neck 32 is generally parallel to the upright axis of sleeve 33. A second plate 61 rests on top of first plate 54. A downwardly directed tubular member 62 is secured to the center of second plate 61. Tubular member 62 extends down into the cylindrical passage 63 of neck 32 with the outside cylindrical surface thereof located in surface engagement with the inside surface of neck 32. Plate 61 has a flat bottom face 64 located in surface engagement with the top flat face 66 of the plate 54. Plate 61 has a downwardly directed tab 67 that extends downwardly adjacent the semi-circular outer edge 57 of plate 54. As shown in FIG. 9, tab 67 angularly moves between the stop edges 58 and 59 to limit the rotation of note display panel 26 to about 180 degrees about the upright axis of neck 32. Stop edges 58 and 59 are orientated about 90 degrees relative to shoulders 43 and 46.

Figure 6:
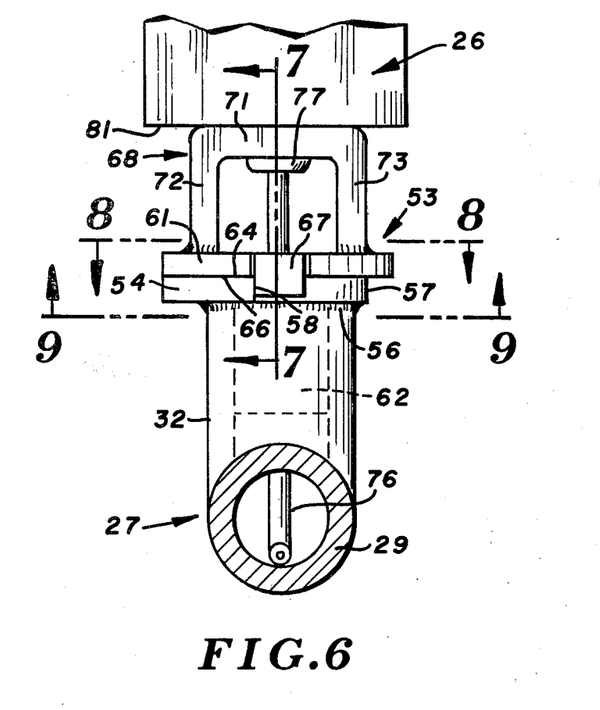
FIG. 6 is a sectional view taken along the line 6—6 of FIG. 2.
Figure 7:
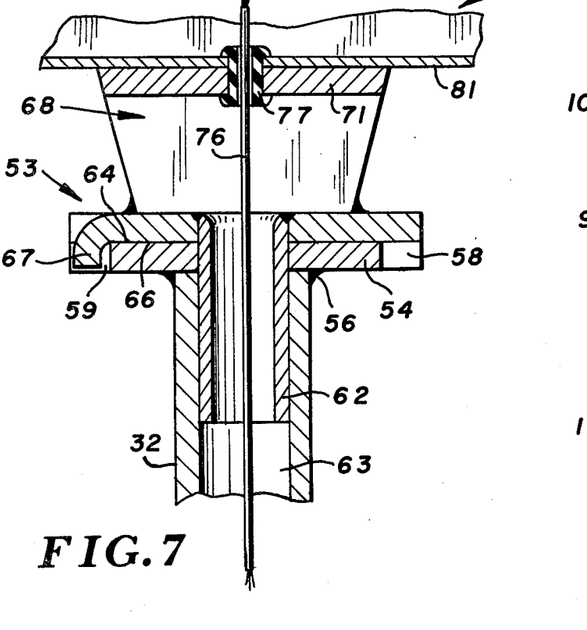
FIG. 7 is a sectional view taken along the line 7—7 of FIG. 6.
Figure 8:
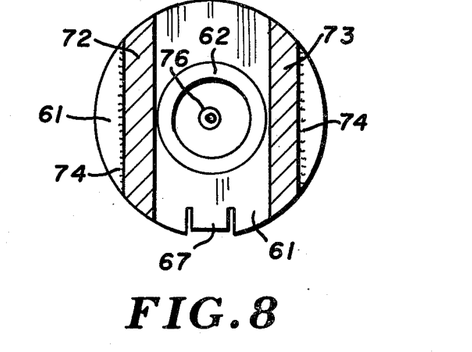
FIG. 8 is a sectional view taken along the line 8—8 of FIG. 6.

A bridge comprising a generally inverted U-shaped member 68 is secured to the top of plate 61 and the center of the bottom of note display panel 26. Bridge 68 has a generally flat base 71 and a pair of downwardly directed legs 73 and 74. The legs 73 and 74 are secured by welds to the top of plate 62.

Note display panel 26 is electrically coupled with a cable 76 that extends through swivel unit 53, arm 27, motion limiting structure 41, and sleeve 33 of mount 28. As shown in FIG. 2, cable 76 extends through a hole in the back wall 23 into housing 11. The cable 76 is electrically coupled to the keyboard electrical circuit hereinafter described. A cable 76 extends through a grommet 77 mounted in the hole in the base 71 of bridge 68.

Referring to FIGS. 1 and 2, note display panel 26 has a rectangular shaped housing or casing having upright side walls 78 and 79 joined to generally horizontal top and bottom walls 80 and 81, respectively. The back of the housing is closed with an upright rectangular shaped back wall 82. A front panel 83 closes the front of the housing.

Figure 10:
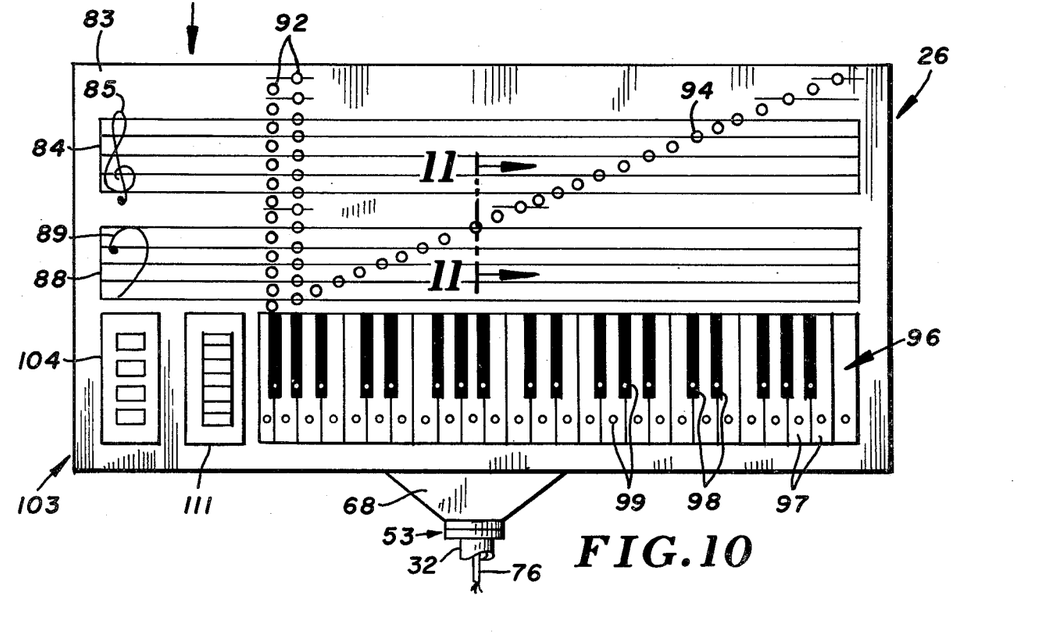
FIG. 10 is an enlarged front elevational view of the note display unit.

Referring to FIG. 10, front panel 83 has printed thereon the grand staff comprising the treble lines 84 and the base lines 88, treble clef sign 85, and base clef signs 85 and 89. The music instructor can use a grease pencil to write the key and time signature on panel 83. Panel 83 includes a plurality of vertical chord light indicators 92 representing a vertical or chord pattern extended from the top to the bottom of the grand scale adjacent the time signatures 87 and 91. Light indicators 92 are in two vertical rows and indicate a 26 note range from F21 to C64.

Figure 11:
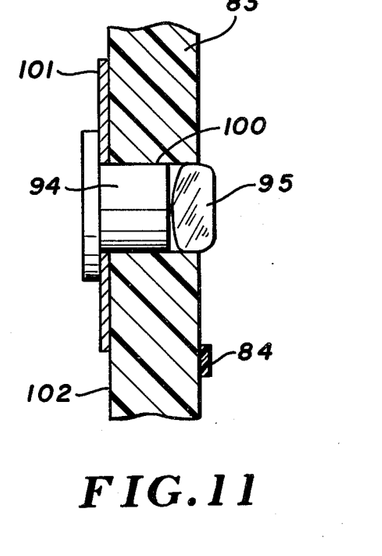
FIG. 11 is an enlarged sectional view taken along the line 11—11 of FIG. 10.

A plurality of diagonally aligned or scale light indicators 94 extend from the lower left to the upper right of the grand scale. The light indicators 94 are in general vertical alignment with separate keys of a keyboard representation 96. The keyboard representation 96 includes the white keys 97 and the sharp and flat black keys 98. Each representation of keys 97 and 98 includes a light indicator 99. As shown in FIG. 11, light indicator 94 is located in a hole 100 in panel 83. Light indicator 94 conductively engages a portion of a printed circuit 101 on the inside surface 102 of panel 83. A light reflective cup carrying a light defusing lens 95 is located in hole 100 adjacent the outside of indicator 94. The light indicator 94 is a light emitting diode that is electrically connected to printed circuit 101 or similar suitable electrical circuitry. Light indicators 92 and 99 are light emitting diodes, similar to indicator 94, located in holes in panel 83. Light indicators 92, 94, and 99 can be incandescent light bulbs.

Figure 12:
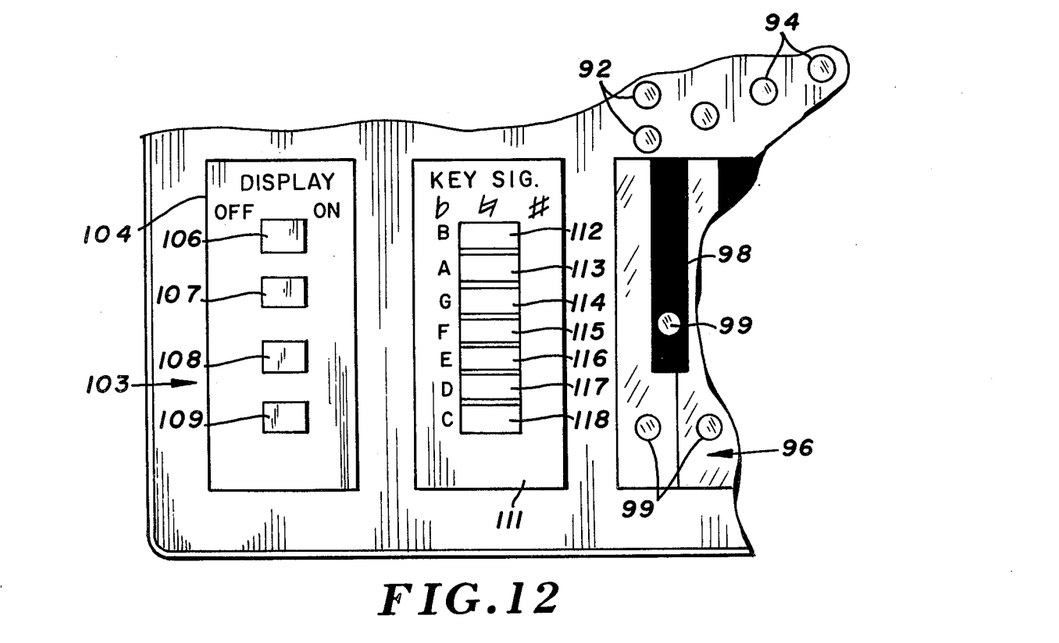
FIG. 12 is an enlarged front elevational view of the panel controls.

Light indicators 92, 94, and 99 are electrically connected to a display control indicated generally at 103. The display control 103 is located in the left lower corner of panel 83. Referring to FIG. 12, control 103 has a first switch assembly 104 for controlling the light indicators 92, 94, and 99. Switch assembly 104 has a scale switch 106, a chord switch 107, a keyboard switch 108, and a retention switch 109. Each switch 106-109 can be moved to either an off or on position whereby the piano player can control the light information displayed by note display panel 26. When switches 106, 107, and 108 are in the on positions, all of light indicators 92, 94, and 99 corresponding to a key depressed on the electronic piano keyboard 19 will be on or displayed. Light indicators 92, 94, and 99 will remain on as long as the key is depressed. The retention switch 109, when in the on position, will hold the light indicators in their on positions after the key on the keyboard has been released.

Figure 13:
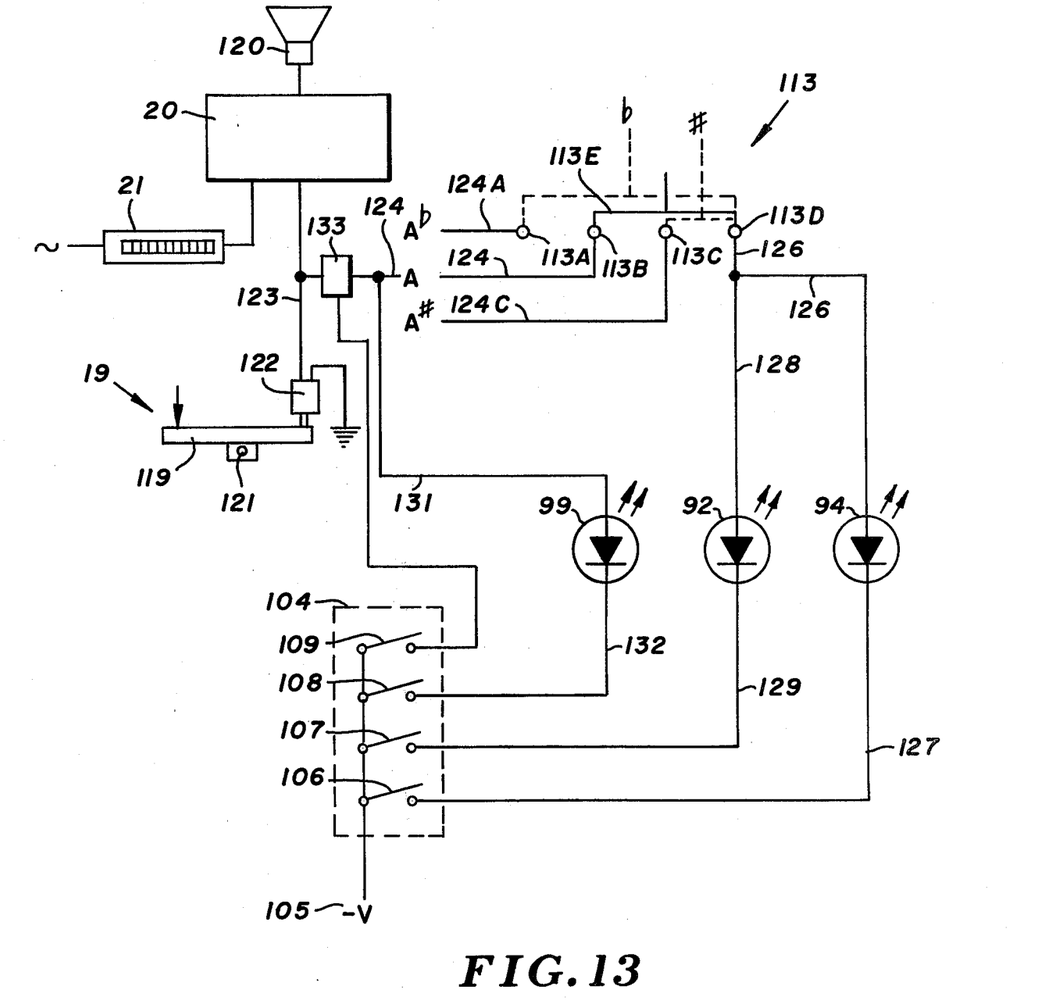
FIG. 13 is a circuit diagram coupling the music note display apparatus with the keyboard circuit of the electronic piano.

Display control 103 includes a second switch assembly 111 for use to change the key signatures or sharp and flat notations. Switch assembly 111 has the B, A, G, F, E, D, and C flat and sharp switches 112, 113, 114, 115, 116, 117, and 118, each selectively movable between right, center, left, or flat, natural, sharp positions. Each switch 112-118 is four pole triple throw switch unit electrically connected to the natural, flat, and sharp lines associated with the keys of the piano. Switch 113 is shown in FIG. 13. Switch 113 has four contacts 113A, 113B, 113C and 113D. Contact 113D is a common contact connected to line 126. Contacts 113A, 113B, and 113C are connected to keyboard line 124, 124A and 124C. Line 124 is connected to the A natural key. Line 124A is connected to the A flat key. Line 124C is connected to the A sharp key. Switch actuator 113E is in the neutral position connecting contacts 113B and 113D. Actuator 113E can be moved to the A flat position connecting contacts 113A and 113D or the A sharp position connecting contacts 113C and 113D.

The electrical circuit diagram of note display panel 26 coupled to electronic piano 10 is shown in FIG. 13. The circuit shows one key 119 of piano keyboard 19 electrically connected to diodes 92, 94, and 99. Each of the remaining keys are similarly electrically connected to the diodes or lights associated with each key.

Key 119 movably mounted on pivot 121 is depressed to actuate a switch 122. An electrical cable 123 connects switch 122 to piano electronic circuit 20. Circuit 20 has an audio output 120. Second switch assembly 111 is connected to line 123 with key lines. Each four pole switch unit 112–118 is connected with separate lines to the flat, natural, and sharp keys of a keyboard note. The appropriate flat, natural or sharp switch unit 112–118 is turned on to correspond to the music to be played to complete the electrical circuits between lines 124 and 126.

Scale diode 94 is connected to lines 126 and 127. Scale switch 106 is operable to connect negative voltage 105 to line 127 so that when key 119 is depressed to actuate switch 122 diode 94 is turned on producing a visible light. A second line 128 connects line 126 to diode 94. A line 129 connects diode 92 to chord switch 107 which is joined with switches 106, 108, and 109 to voltage 105. When switch 107 is on and key 119 is depressed, chord diode 92 is turned on producing visible light. Keyboard diode 99 is connected with lines 131 and 132 to line 124 and switch 108, respectively. When keyboard switch 108 is on and key 119 is depressed, keyboard diode is turned on producing visible light. All switches 106, 107, 108 can be turned on, so that when key 119 is depressed, all lights or diodes 92, 94, and 99 associated with key 119 will be turned on. Alternatively, two of the three switches 106, 107, and 108 can be on so that two of the diodes 92, 94, and 99 associated with key 119 will be turned on.

Light retention switch 109 is connected with line 124 to circuit continuing component 133 interposed in line 124. Component 133 may be a solenoid holding switch or an integrated circuit arrangement. When switch 109 is on and at least one of the switches 106, 107, and 108 is on, depressing key 119 will turn at least one diode on. This diode will remain on until switch 109 is turned off. When all of switches 106, 107, and 108 are on all of the diodes 92, 94, and 99 will remain on if retention switch 109 is on.

Figure 14:
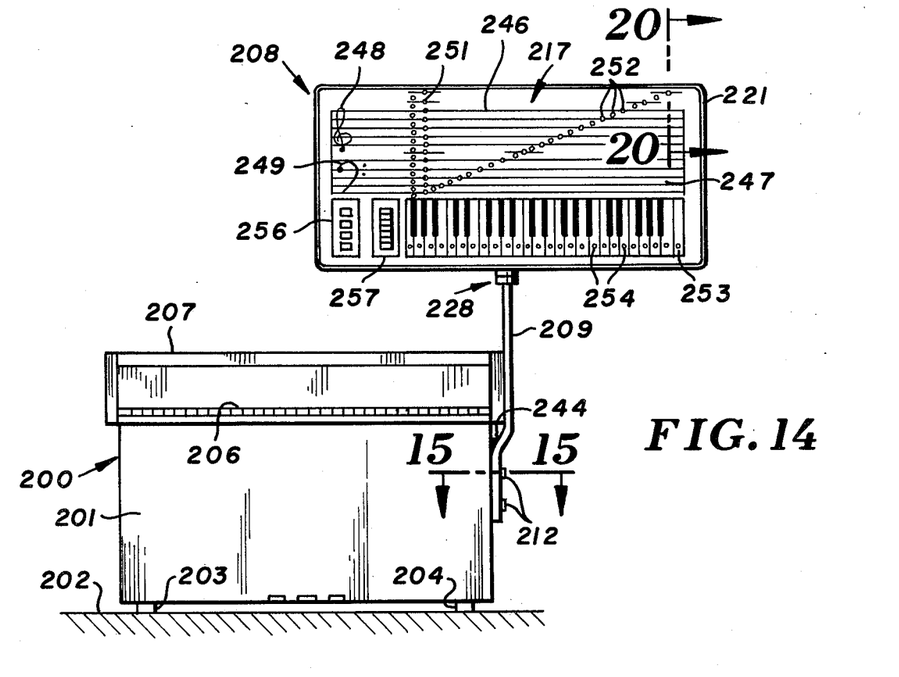
FIG. 14 is a front elevational view of an electronic piano with a modification of the music note display apparatus of the invention.

Referring to FIG. 14, there is shown the modification of the note display apparatus of the invention mounted on an electronic piano indicated generally at 200. Piano 200 has a case or housing 201 movably supported on a surface 202 with a plurality of castor wheels 203 and 204. The upper portion of case 201 supports a conventional keyboard 206. Keyboard 206 has a note range from F21 to C64. The top of the case is enclosed with a cover 207.

Figure 15:
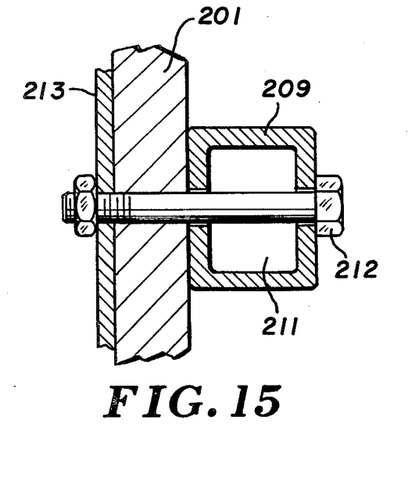
FIG. 15 is an enlarged sectional view taken along the line 15—15 of FIG. 14.

A note display apparatus indicated generally at 208 is supported on the right side of piano case 201 with an upright arm or post 209. Post 209 is a square tubular member having a passage 211 to accommodate the electrical cord or lines that interconnect piano 200 with the note display apparatus 208. As shown in FIGS. 14 and 15, a plurality of nut and bolt assemblies 212 secure arm 209 to side of case 201. A backing plate 213 engages the inside of case 201 and forms a bearing plate for the nuts of the nut and bolt assemblies 212.

Figure 16:
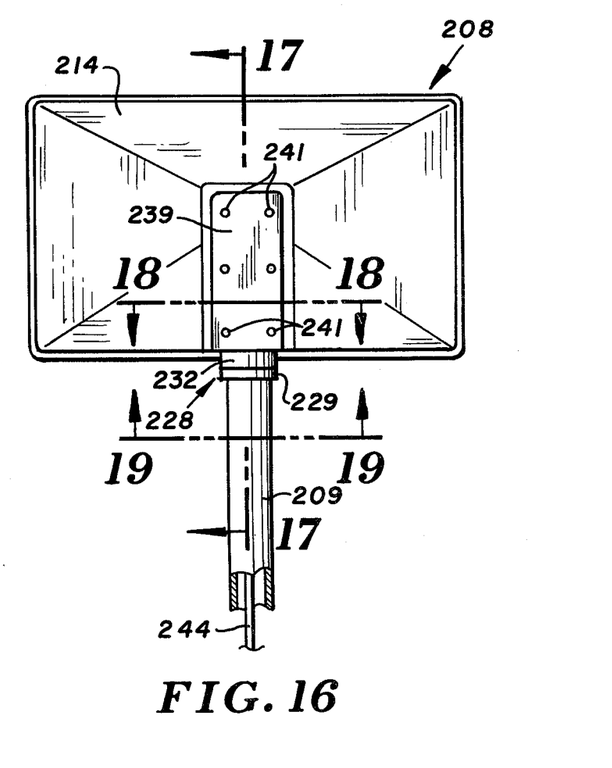
FIG. 16 is an enlarged rear elevational view of the music note display apparatus of FIG. 14.

As shown in FIG. 16, note display apparatus 208 has a generally rectangular body 214 surrounding a chamber 215 having an open forward side. A continuous stepped flange or lip 216 surrounds the open side of chamber 215.

Figure 19:
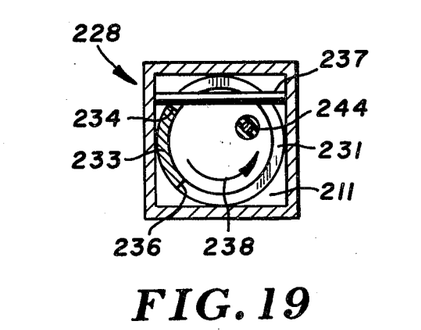
FIG. 19 is an enlarged sectional view taken along the line 19—19 of FIG. 16.

A panel assembly indicated generally at 217 having a visual note display is mounted on body 214 and extends across the open side of chamber 215. As shown in FIG. 19, a hook-shaped clip 218 extends over an outer peripheral edge portion of panel assembly 217 to locate the outer peripheral edge of the panel assembly in the step formed by flange 216. A screw 219 holds the clip 218 and panel assembly 217 in assembled relation with body 214. A plurality of clips, similar to clip 218, are used to mount panel assembly 217 on body 214. A decorative molding 221 mounted on the outer edge of flange 216 surrounds panel assembly 217 and covers the outer edges of the clips 218.

Figure 17:
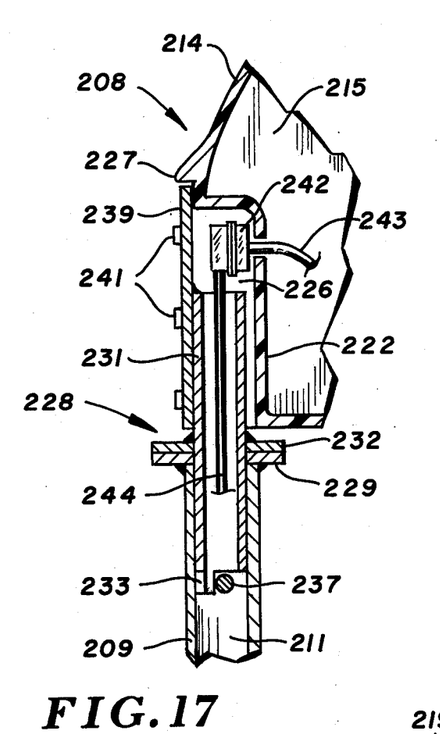
FIG. 17 is an enlarged sectional view taken along the line 17—17 of FIG. 16.
Figure 18:
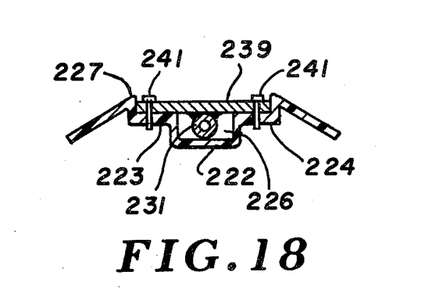
FIG. 18 is an enlarged sectional view taken along the line 18—18 of FIG. 16.

Referring to FIGS. 17 and 18, body 214 has a central recess wall section 222 having recess shoulders 223 and 224 forming a pocket 226. A short outwardly directed continuous lip 227 surrounds shoulders 223 and 224.

As shown in FIG. 17, a motion limiting means or pivot support indicated generally at 228 supports note display apparatus 208 on the top of arm 209. Motion limiting means 228 allows the display apparatus 208 to be rotated 180 degrees from a position facing the piano player, as shown in FIG. 14, to a position facing away from the piano player. Motion limiting means 228 comprise a stationary annular plate or bearing washer 229 secured to the top of post 209. An upright tubular member 231 extends down into passage 211 of arm 209 and up into pocket 226. An annular plate or bearing washer 232 secured to a mid-section of member 231 engages the top annular surface of washer 229. Tubular member 231 is rotatable about the upright axis of passage 211 of arm 209. The rotation of member 231 is limited to about 180 degrees by a downwardly directed lip 233 on the lower end of member 231. Lip 233 has an arc of about 90 degrees and opposite ends forming stop edges 234 and 236. A stop pin 237 is secured to arm 209. As shown in FIG. 19, pin 237 extends across a side portion of passage 211 and is selectively engaged by stop edges 234 and 236 to limit rotation of tubular member 231. Tubular member 231 can be rotated in the direction of the arrow 238 until stop edge 236 engages pin 237. A plate or cover member 239 is secured by welds or the like to the upper portion of tubular member 231. Plate 239 fits into pocket 226 and engages shoulders 223 and 224. The outer edges of plate 239 are located in engagement with the 227. A plurality of fasteners 241, such as bolts, secure plate 239 to shoulders 223 and 224.

As shown in FIG. 17, an electrical two-part connector 242 is located in the upper portion of pocket 226. Connector 242 connects a first line 243 leading to the panel assembly 217 to a second line 244 leading to the electronic piano. Second line 244 extends through tubular member 231 and passage 211 of arm 209 to the piano circuit means.

Returning to FIG. 14, panel assembly 217 has a visible front face having the grand staff comprising treble lines 246 and base lines 247 and treble clef sign 248 and base clef sign 249. Key signatures and time signatures can be applied to the panel adjacent the treble and base clef signs 248 and 249 by the music instructor with a conventional grease pencil or the like. A plurality of vertical cord light indicators 251 representing a vertical or cord pattern extend from the bottom of the grand staff adjacent the time signatures 248 and 249. Light indicators 251 and in two vertical rows and indicate a 26-note range from F21 to C64.

A plurality of diagonally aligned or scale-light indicators 252 extend from the lower left to the upper right of the grand scale. Light indicators 252 are in general vertical alignment with separate keys on a keyboard pattern or representation 253. Keyboard representation 253 includes the white keys and the sharp and flat black keys of a conventional piano keyboard. Each representation of a key includes a light indicator 254.

The panel 217 includes a light indicator switch 256 and a key signature switch 257. The information regarding switches 256 and 257 is identical to the panel information on the display panel 26 shown in FIG. 10.

Returning to FIG. 20, panel assembly 217 has a light transparent flat sheet member or base 258. Sheet member 258 is a clear material, such as plastic, that extends across the open side of body 214. The outer peripheral edge of sheet member 258 engages flange 216 and is retained thereon with clips 218. A film 259, such as a polycarbonate film, located over the outer surface of sheet member 258 is secured thereto with an adhesive 261. Preferably, adhesive 261 is a clear adhesive. The treble lines 246, base lines 247, treble clef signs 248, and base clef sign 249 are printed on the inside surface of film 259.

Figure 20:
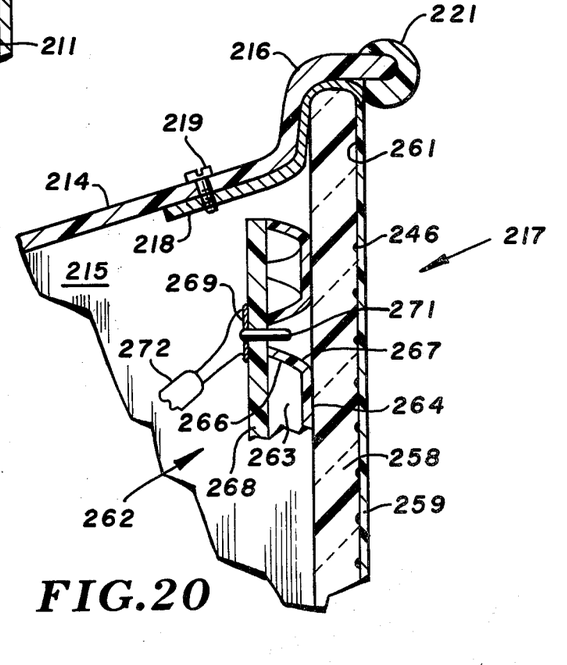
FIG. 20 is an enlarged sectional view taken along the line 20—20 of FIG. 14.

A circuit assembly indicated generally at 262 is located in the chamber 215 behind sheet member 258. Circuit assembly 262 has a panel 263 secured with an adhesive 264 to the inside surface of sheet member 258. The panel 263 has a plurality of projections or bosses 266 in the position of the scale light indicators. Additional panels (not shown) have bosses for the chord light indicators and keyboard light indicators. Each projection has a generally cone-shaped inside surface 267. The large end of the cone-shaped surface 267 faces sheet member 258. The surface 267 can be provided with an aluminum coating to enhance its light reflecting characteristics. A circuit board 268 is attached to the back of panel 263 with suitable connectors, such as clips or fasteners (not shown). The circuit board has a printed circuit 269 that is connected to incandescent lamps or light bulbs 271 supported by the board 268. Bulbs 271 project into the cone-shaped members 266. The printed circuit is connected with cable 272 to the connector 242 located in the pocket 246 in body 214.

The electrical circuit diagram coupling the piano electronic circuit 20 with the printed circuit 249 and lamps 271 associated therewith is identical to the circuit shown in FIG. 13. The chord, scale and keyboard light bulbs 271 replace the light emitting diodes 92, 94, and 99. Switches 106 to 108 separately control the chord, scale and keyboard lights associated with each key. Retention switch 109, when turned on, functions to maintain the electrical circuit to one or more of the chord, scale and keyboard lights so that the lights will remain on after each piano key has been released.

While there has been shown and described two embodiments of the music note display apparatus and structure for mounting the apparatus on an electronic piano, it is understood that changes in the structure and electrical circuits may be made by those skilled in the art without departing from the invention. The invention is defined in the following claims.

The embodiment of the invention in which an exclusive property or privilege is claimed is defined as follows:

1. Music instruction apparatus comprising,
   a piano having a housing, a keyboard with a plurality of keys, and an electronic means producing an output corresponding to one or more depressed keys,
   music note display means including a panel having a grand staff indicia, a vertically disposed series of first light means corresponding to chord note information coordinated with said indicia, a series of second light means diagonally coordinated with said staff indicia and corresponding to an ascending scale note scale information, a keyboard representation located directly below the second light means, said keyboard representation having piano key indicia vertically aligned with second light means whereby a piano key indicia is vertically aligned with each ascending note, and a series of third light means associated with each of said keyboard indicia,
   a tubular support arm, means mounting said arm on the housing of said piano and connecting said arm to said display means for permitting rotational movement of said display means about a generally vertical axis through substantially 180° thereby to locate said display means in a selected adjustable position for ready viewing by persons proximate to the piano,
   and, electric circuit means selectively connected to said first, second, and third light means and to said electronic means of said piano, and including elements extending through said tubular support whereby, when a key of the piano is depressed, at least a selected one of the first, second, and third light means is turned on corresponding to said depressed key.

2. The music instruction apparatus of claim 1 wherein said arm includes a substantially horizontal body terminating at opposite ends in upwardly and downwardly directed legs merging respectively into said means connecting said arm to said display means and into said means mounting said arm on said piano.

3. The music instruction apparatus of claims 1 or 2 wherein said connecting means includes first and second relatively rotatable members respectively having circumferentially spaced stop means and a tab means engageable with said stop means at opposite limits of rotation.

4. The apparatus of claim 1 wherein: the electric circuit means includes a first on-off switch connected to the first light means, a second on-off switch connected to the second light means, and third on-off switch connected to the third light means, said first, second, and third on-off switches being separately operable whereby the first, second, and third light means can be selectively operated.

5. The apparatus of claim 4 wherein: the first, second, and third switches are mounted on said display means.

6. The apparatus of claims 1 or 5 wherein: the electric circuit includes a switch assembly having a plurality of key signature switches operable to coordinate the first, second, and third light means with the piano keyboard in accordance with the key signature of the music that is being played.

* * * * *